Oct. 21, 1969  R. J. SELZER  3,473,797
FLEXIBLE VEHICLE AXLE SUSPENSION ASSEMBLY
Filed Aug. 25, 1967
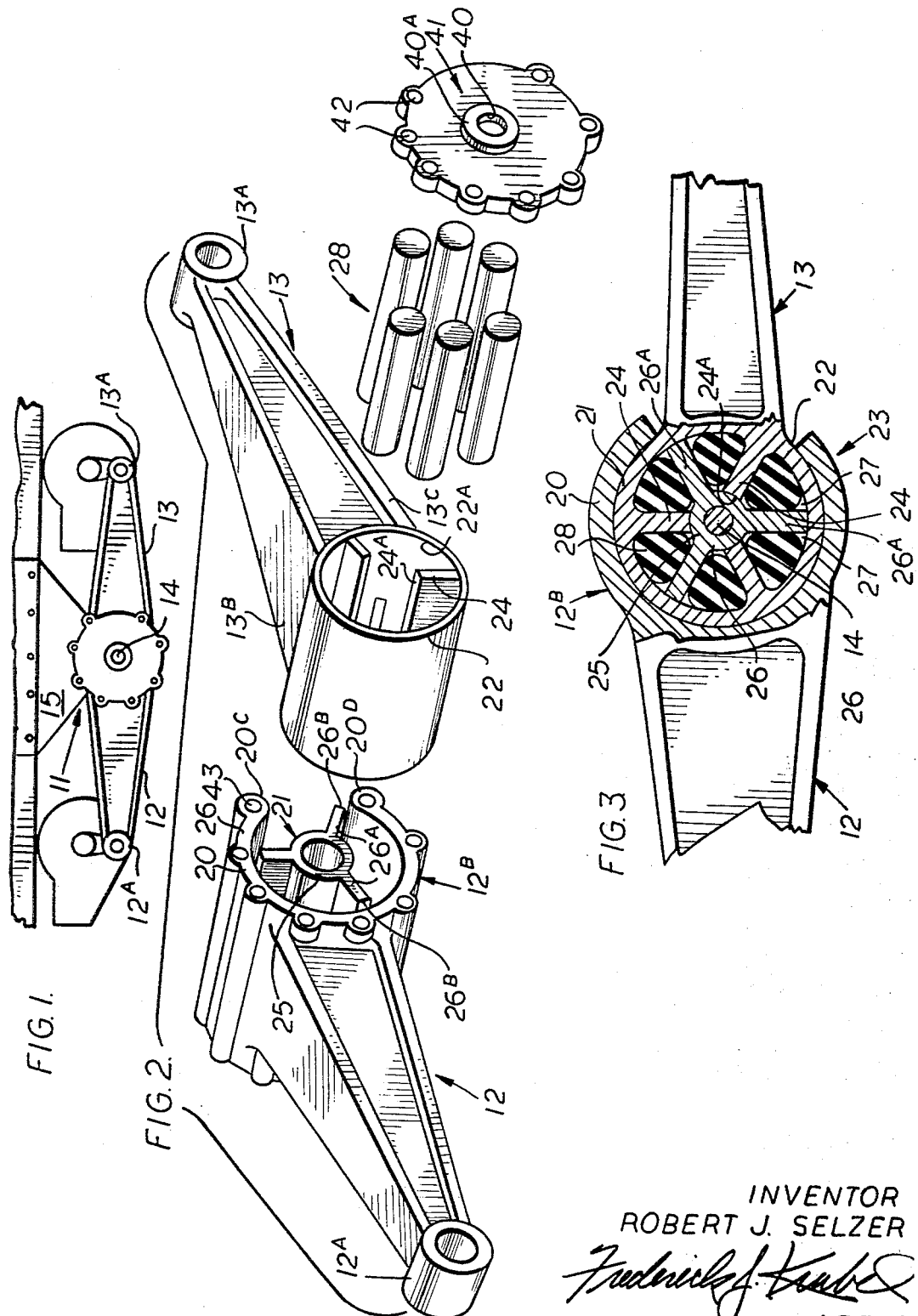
INVENTOR
ROBERT J. SELZER
Frederick J. Krabe
ATTY

United States Patent Office 3,473,797
Patented Oct. 21, 1969

3,473,797
FLEXIBLE VEHICLE AXLE SUSPENSION ASSEMBLY
Robert J. Selzer, Fort Wayne, Ind., assignor to International Harvester Company, Chicago, Ill., a corporation of Delaware
Filed Aug. 25, 1967, Ser. No. 663,276
Int. Cl. B60g *5/00;* F16f *1/44*
U.S. Cl. 267—57.1                               7 Claims

ABSTRACT OF THE DISCLOSURE

A vehicle axle suspension assembly combining elastic means for cushioning a pivotal joint against circumferential torque and relatively rigid radial means resisting displacement of the members thereof radially.

REFERENCES

My invention differs from the structures of prior U.S. patents to Neidhart Nos. 2,712,242 and 2,729,442, Rohr No. 2,861,796, Willetts No. 3,013,808, Nilsson No. 3,087,716, and others in providing in combination elastic means resisting torque circumferentially of the axis of a pivotal joint and relatively rigid means resisting displacement of the components thereof radially.

DRAWINGS

In the drawings:
FIG. 1 is a schematic illustration in side elevation of an embodiment of one form of my invention;
FIG. 2 is a view of components of the structure illustrated in FIG. 1 in exploded perspective;
FIG. 3 is a fragmentary view, partially in vertical section perpendicular to the axis of the shaft shown in FIG. 1.

DESCRIPTION

The suspension assembly 11, schematically illustrated in FIG. 1 of the drawings in operative position on an automotive vehicle (not shown), for example, comprises first and second beam members 12, 13, respectively in end to end arrangement. These are pivotally suspended adjacent their outer extremities 12a, 13a, respectively, in suitable operative relation with the axles of the vehicle. The inner end portions of members 12, 13 interfit in rotative relation about the axis of a shaft 14, suitably supported by a bracket 15 which depends from a lateral, longitudinally extending member of the vehicle frame (not shown).

The inner extremity 12b of member 12, in the form of a fractional sleeve 20, the interior surface of which provides a bearing 21 for the fractional journal 22 of the generally tubular end portion of member 13, thus forming a pivotal joint 23.

Extending radially inward of journal 22, vanes 24, spaced generally 120° apart, are arranged with their inner extremities 24a bearing upon the periphery of the hub 25 of a three-vaned sleeve core 26. The latter is journalled on shaft 14, disposed co-axially therewith and with journal 22 and sleeve 21.

Vanes 26a of core 26, spaced correspondingly with vanes 24, i.e., 120° apart, extend radially, with their end portions 26b in counter bearing relation with the inner surface 22a of journal 22, but in the position illustrated in FIG. 1, are disposed midway of vanes 24 so as to provide chambers 27, between opposing vanes for receiving generally cylindrical, elastic cushions 28. As illustrated in FIG. 1 the chambers 27 extend approximately 50° circumferentially.

Sleeve 20 is open at its inner extremity, a gap being provided between upper and lower terminal portions 20c, 20d, which limit pivotal movement of members, 12, 13 about the axis of shaft 14, enabling the fitting together of the members, and providing an abutment for upper and lower surfaces 13b, 13c of member 13. As shown in FIG. 3, the terminal portions 20c, 20d are spaced approximately 90° and equidistant from the longitudinal axis of member 13.

The outer end portion of shaft 14 is received in a bore 40 of hub 40a on cover plate 41 which is suitably secured to the outer end portion of sleeve 20, as by means of bolts (not shown) operatively receivable in registering bores 42, 43, in plate 41 and sleeve 20.

It will be observed that in operation torque applied to beam members 12, 13 tending to rotate them about the axis of shaft 14, whether clockwise or anti-clockwise will tend to compress and so distort cushions 28, circumferentially and radially, thereby alleviating the incidental shock. The vanes, functioning in association with the cushions, and having their projecting end portions in bearing relation with the proximate surfaces of the journal and the hub, respectively, serve both to cause and to limit distortion of the cushions, and to center the joint.

The durometer of the cushions, which preferably are of rubber, will of course vary with the load specifications of the vehicle.

It will be understood that changes of form and structure including reversal of parts, substitution of equivalents, and other modifications, may be made without departing from the spirit of the invention.

I claim:
1. In a vehicle axle suspension assembly, comprising, a first elongated beam member having one end operatively connected to an axle of a vehicle; and means for operatively connecting the opposite end of said first beam member to the vehicle for controlled relative pivotal movement therebetween about a generally horizontal axis extending normally with respect to the longitudinal axis of said first beam member, including a sleeve-like core supported on the vehicle and having a plurality of circumferentially spaced vanes extending radially outwardly from the outer peripheral surface thereof, a fractional sleeve fixed with respect to said core having a bearing surface concentrically disposed with respect to said outer peripheral surface of said core, a fractional tubular journal fixed to said first beam member and receivable within said fraction sleeve, the outer peripheral surface of said journal being in coaxial bearing relationship with said bearing surface of said fractoinal sleeve, said tubular journal having a plurality of circumferentially spaced vanes extending radially inwardly from the inner peripheral surface thereof, each of said vanes being circumferentially spaced between a respective pair of adjacent vanes extending radially outwardly from said core and having a terminal portion in bearing engagement with said outer peripheral surface of said core, each of said vanes extending radially outwardly from said core outer peripheral surface having a terminal portion in bearing engagement with the inner peripheral surface of said tubular journal, and a plurality of elastic cushioning elements, each of said elements being disposed between a respective radially inwardly extending vane and the adjacent radially outwardly extending vane.

2. In a vehicle axle suspension assembly as set forth in claim 1, wherein said shaft is supported by the vehicle and said elastic cushioning elements are substantially cylindrical in shape in their free and unstressed state; said vehicle axle suspension assembly further including stop means for positively limiting relative pivotal movement between said first beam member and said fractional sleeve.

3. In a vehicle axle suspension assembly as set forth in claim 2, wherein said stop means includes said fractional sleeve, said fractional sleeve being substantially in the form of a hollow cylinder having an arcuate cutaway of approximately 90°, the arcuately spaced terminal portions defining said cutaway being equidistant from the longitudinal axis of said first beam member when the assembly is free of external torque, said first beam member extending through said cutaway and said terminal portions being coperable with proximate surfaces of said first beam member to limit relative pivotal movement between said fractional sleeve and said first beam member.

4. In a vehicle axle suspension assembly as set forth in claim 1, further including a second elongated beam having one end operatively connected to a second axle of the vehicle and its opposite end fixed with respect to said fractional sleeve, said first and second beam members being arranged generally in an end-to-end relation with their longitudinal axes lying substantially in a common vertical plane, and said shaft is supported by the vehicle.

5. In a vehicle axle suspension assembly as set forth in claim 4, wherein said elastic cushioning elements are substantially cylindrical in shape in their free and unstressed state, said elements being disposed so that their longitudinal axes are substantially parallel with respect to each other and the pivotal axis of said first and second beam members.

6. In a vehicle axle suspension assembly as set forth in claim 5, further including stop means for positively limiting relative pivotal movement between said first and second beam members.

7. In a vehicle axle suspension assembly as set forth in claim 6, wherein said stop means includes said fractional sleeve, said fractional sleeve being substantially in the form of a hollow cylinder having an arcuate cutaway of approximate 90°, the arcuately spaced terminal portions defining said cutaway being equidistant from the longitudinal axis of said first beam member when the assembly is free of external torque, said first beam member extending through said cutaway and said terminal portions being cooperable with proximate surfaces of said first beam member to limit relative pivotal movement between said first and second beam members.

References Cited

UNITED STATES PATENTS 3,013,808  12/1961  Willetts _____ 280—104.5

FOREIGN PATENTS 1,272,967  4/1961  France.

ARTHUR L. LA POINT, Primary Examiner

H. BELTRAN, Assistant Examiner

U.S. Cl. X.R.

280—104.5